United States Patent [19]
Monson

[11] Patent Number: 5,090,935
[45] Date of Patent: Feb. 25, 1992

[54] COMPOSITE TOY HAVING INTERCONNECTABLE TOY COMPONENTS

[76] Inventor: Chris S. Monson, 5722-47 E. Stillwater, Orange, Calif. 92669

[21] Appl. No.: 628,415

[22] Filed: Dec. 17, 1990

[51] Int. Cl.[5] .......................... A63H 3/16; A63H 3/02; G09B 27/08; A63F 9/10
[52] U.S. Cl. .................................. 446/101; 446/369; 446/76; 446/901; 434/133; 434/147; 273/157 R
[58] Field of Search ................... 273/157 R; 434/131, 434/130, 133, 137, 147; 446/901, 101, 99, 98, 97, 85, 69, 71, 72, 73, 75, 76, 268, 369, 371, 372, 487

[56] References Cited

U.S. PATENT DOCUMENTS

| 1,071,358 | 8/1913 | Matthews | 434/137 |
| 2,987,318 | 6/1961 | Hammer | 446/85 X |
| 3,471,946 | 10/1969 | Ashley | 434/137 |
| 3,618,955 | 11/1971 | Barnes | 434/147 X |
| 3,831,316 | 8/1974 | Weistrop | 446/369 X |
| 4,413,442 | 11/1983 | McSweeney | 446/901 X |
| 4,595,367 | 6/1986 | Forsyth | 434/147 |
| 4,719,656 | 1/1988 | Godinet | 273/157 R X |
| 4,722,719 | 2/1988 | Williams et al. | 446/901 X |
| 4,723,930 | 2/1988 | Freese | 446/268 X |
| 4,755,141 | 7/1988 | Nakai | 446/901 X |
| 4,937,181 | 6/1990 | Rogers | 446/901 X |

FOREIGN PATENT DOCUMENTS

| 2559072 | 8/1985 | France | 446/487 |
| 1257666 | 12/1971 | United Kingdom | 446/901 |
| 2135591 | 9/1984 | United Kingdom | 446/478 |
| 2215226 | 9/1989 | United Kingdom | 446/73 |

Primary Examiner—David N. Muir
Attorney, Agent, or Firm—Leonard Tachner

[57] ABSTRACT

A composite toy having a plurality of interfitting toy components. The composite toy and the toy components, each has the shape of a separately identifiable structure, the exterior surfaces of the toy components forming the exterior surface of the composite toy when they are interconnected in a selected relationship. In the embodiment shown herein, the composite toy consists of a globe depicting the Earth's surface, including its land and water masses. The component toys comprise three stuffed animals comprising an elephant, an eagle and a whale. Fastening means are provided to permit interconnection of the toy components in a stable fashion, while minimizing any detrimental impact on the appearance of the completed toy structure. In the embodiment illustrated herein, the fastening devices consist of Velcro strips attached to the edges of the toy components which are adapted to interface with one another when an elephant, eagle and whale are interconnected to form the globe.

20 Claims, 6 Drawing Sheets

COMPOSITE TOY HAVING INTERCONNECTABLE TOY COMPONENTS

BACKGROUND OF THE INVENTION

1. Field of the Invention

The present invention relates generally to the field of toys and more specifically to a composite toy, such as a globe, which comprises a plurality of individual toy components such as differently shaped animals or other inanimate objects which may be interconnected to form the overall composite toy, but which when disconnected from one another, constitute a plurality of individual toys.

2. Prior Art

It is well known in the art to provide a toy which is an assemblage of various, differently shaped toy components. One example of this known to the applicant is disclosed in U.S. Pat. No. 4,723,930 to Freese et al. Freese et al discloses a Noah's Ark toy, comprising an Ark including a hull, a deck releasably snap-locked to the hull and a cabin also releasably snap-locked to the deck. A number of animal units are mounted on the deck. An even more generic form of such toys comprising an assemblage of components would be a set of blocks.

Another well known prior art toy concept consists of providing an outer toy structure which has an interior region into which a plurality of other toy components may be placed. An example of such prior art is disclosed in U.S. Pat. No. 4,235,039 to Brooks, which discloses a playhouse and furniture puzzle. This patent discloses the use of a play dollhouse having an interior space for receiving a plurality of pieces of furniture in a puzzle configuration. A more generic form of toy comprising an outer member receiving a plurality of other toy components within a space formed within its interior would be the dollhouse in general, which is of course, adapted to receive small simulations of furniture in a well known manner.

The present invention is neither merely an assemblage of toy components nor merely an outer toy structure receiving a plurality of component toys within its interior. The present invention is a composite toy, the very existence of which is facilitated by the interconnection of its component toy parts. The closest prior art known to the applicant is U.S. Pat. No. 4,719,656 to Godinet which discloses a bed and mattress formed by a plurality of animal-shaped, nested play cushions. However, even this closest prior art known to the applicant is readily distinguishable from the invention disclosed herein. More specifically, the Godinet bed and mattress device is not a composite toy, it is an object of general utility, namely a bed and mattress. Furthermore, as disclosed in the aforementioned patent, the bed and mattress of Godinet requires the use of non-toy components, such as the side frames disclosed in FIG. 1 thereof. On the other hand, as will be seen hereinafter, in the present invention the composite structure formed by interconnecting a plurality of toy components is in itself a toy structure and not an object of general utility. Furthermore, the composite toy structure of the present invention is formed entirely of the individual toy components and does not require for its formation, the use of any non-toy components. Consequently, the present invention appears to be readily distinguishable of the art known to the applicant and furthermore, provides a number of significant advantages resulting therefrom, which will be further delineated hereinafter.

SUMMARY OF THE INVENTION

The present invention comprises a composite toy, formed by a plurality of toy components. Each of such toy components is in the form of an independent toy, which is adapted to interconnect to the other such component toys to form the composite toy. In a preferred embodiment of the invention shown herein, the composite toy comprises a globe and the plurality of individual toys comprise respectively, an elephant, a whale and an eagle. In the embodiment shown herein, each such toy animal is provided in a soft, flexible, stuffed configuration which is sufficiently flexible so that the exterior surface thereof may be shaped into a segment of a sphere. When the individual stuffed animals are interconnected in a proper configuration with one another, their respective exterior surfaces combine to form a globe. The exterior surface of the globe is provided with all the indicia of a standard reproduction of the Earth's surface. In the embodiments shown herein, the individual stuffed animal toy components of the globe may be interconnected by utilizing fastening means such as Velcro, threaded-loop interconnecting members which are preferably positioned along the interconnecting perimeters of the individual toy animal components of the invention. In the preferred embodiment of the invention, the Velcro interconnecting loop fastening strips are hidden from view when the globe is formed by properly interconnecting the individual toy components. This hiding of the Velcro strips from exterior view is accomplished by providing at least one of the interconnecting regions of the animal toy components with an additional flap of material which is designed to overly the adjoining strip of material of the interconnecting portion of the adjacent toy animal component in order to make it virtually impossible to see the Velcro strips.

Each toy component is specifically designed with shape, flexibility and material to interface with the other such toy components in only one possible spherical configuration to achieve the formation of the composite toy. Thus, in the embodiment shown herein, the stuffed elephant, whale and eagle can form a globe reproduction of the Earth only when they are interconnected in a particular configuration which results in the formation of an exterior surface that is spherical in shape and which positions the continents and oceans of the Earth in their proper relative locations. Thus, the present invention provides a number of significant and advantageous features for children, including, but not necessarily limited to, the advantage of an educational device for teaching children the relative positions of land masses and water masses on the Earth's surface. Children are motivated to learn the relative positions of the features of the Earth's surface in order to facilitate interconnecting the composite toy components in the proper sequence and relative configuration for achieving formation of the overall globe structure of the composite toy. Thus, the present invention is intellectually motivating and educational on the one hand, while providing a plurality of attractive and entertaining individual toy component structures such as the stuffed animals of the embodiment shown herein, on the other hand.

In the preferred embodiment of the present invention, there are three individual toy components. However, it will be understood that the number of individual toy components making up the composite toy, may be virtually any number, depending upon the individual creativity of the designer, as well as the desired range of manufacturing costs and retail price of the finished product. Furthermore, while the preferred embodiment shown herein comprises a plurality of stuffed animals which may be interconnected to form the stuffed globe having a soft exterior surface made of a fabric such as felt or the like, it will be understood that the individual components of the present invention may be made of other materials, such as soft plastics, rubber-like materials, and other such materials which facilitate safe enjoyment by children, as well as relatively easy interconnection of the individual components to form the overall composite toy structure. Furthermore, it will be understood that the overall concept of the present invention, namely providing a composite toy which is formed of a plurality of individual, interconnectable toys which are separately entertaining, may be provided in other forms and shapes, not necessarily limited to spherical representations of a globe. Thus, the gist of the present invention is that of providing a useful and entertaining composite toy which is formed of a plurality of useful and entertaining component toys which are interconnectable to form the composite structure, wherein both the component toys and the composite toy comprise readily recognizable shapes which are attractive, entertaining and preferably educational to children of appropriate ages.

Unlike the prior art known to the applicant herein and described above, the composite toy structure of the present invention relies on the interconnection of its component toy parts. It is not merely an assemblage of toy parts as in U.S. Pat. No. 4,723,930 and it's not merely a container of toy parts as in U.S. Pat. No. 4,235,039. Structurally it is more akin to the subject of U.S. Pat. No. 4,719,656, but with a toy composite structure as opposed to a mere object of general utility (i.e., bed and mattress) shown therein.

OBJECTS OF THE INVENTION

It is therefore a principal object of the present invention to provide a composite toy structure which comprises a plurality of disassemblable component toy structures, the shape and exterior characteristics of both the components and the composite toy structures being simulations that are readily recognizable characters or inanimate objects to both entertain and preferably educate children.

It is an additional object of the present invention to provide a toy globe, the exterior surface of which simulates the appearance of a recognizable subject, such as the surface of the Earth or other such celestial body, such toy globe being formed of a plurality of individual toy components, such as a plurality of recognizable animal simulations which may be alternately interconnected or disconnected from one another to allow children to play with either the individual components thereof or the composite structure.

It is still an additional object of the present invention to provide a plurality of stuffed animals or other such readily recognizable objects which may be interconnected in a particular configuration to form a composite structural member in the form of a toy which is also readily recognizable by young children.

It is still an additional object of the present invention to provide a disassemblable fabric surface globe having an exterior surface which provides indicia representative of the Earth's surface, including land mass and water mass features thereof and which comprises a plurality of stuffed animals, including a whale, an eagle and an elephant, each of which forms a segment of a sphere along the exterior surfaces thereof and having inside surfaces which are compatably interconnected, whereby the stuffed animals may be interconnected to form a spherical representation of the Earth's surface.

BRIEF DESCRIPTION OF THE DRAWINGS

The aforementioned objects and advantages of the present invention, as well as additional objects and advantages thereof will be more fully understood hereinafter as a result of a detailed description of a preferred embodiment when taken in conjunction with the following drawings in which.

DETAILED DESCRIPTION OF A PREFERRED EMBODIMENT

Figure 1:
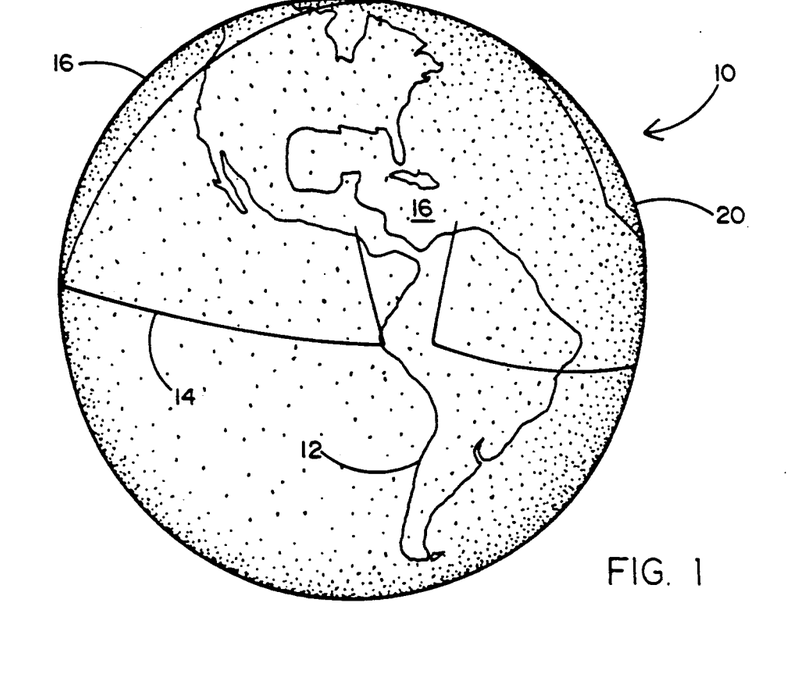
FIG. 1 is a plan view of one side of the composite structure of the present invention.
Figure 2:
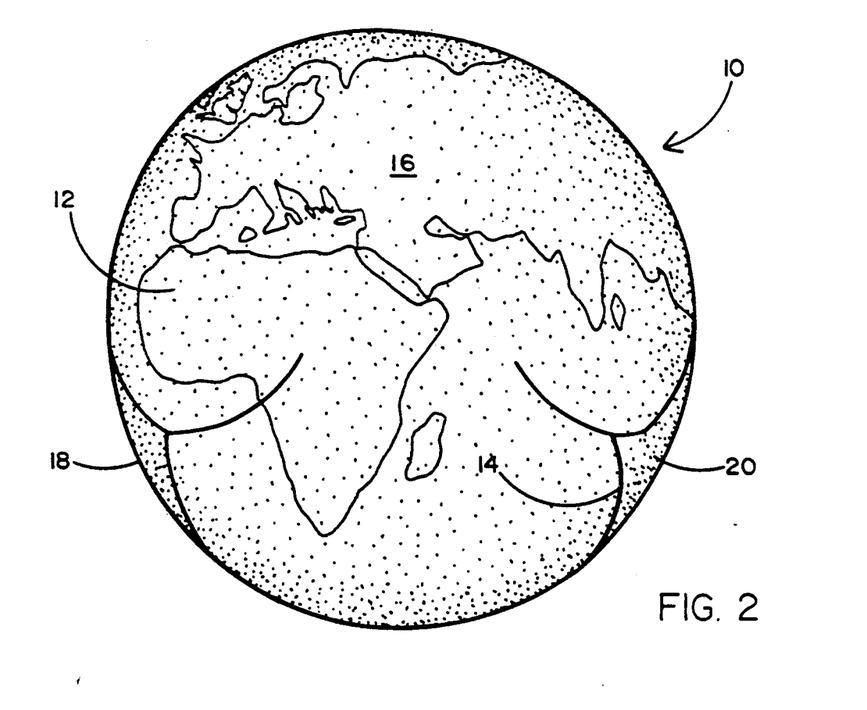
FIG. 2 is a plan view of the opposite side of the composite structure of the present invention.

Referring now to the first eight Figures of the accompanying drawings, it will be seen that the present invention, in its preferred embodiment, comprises a globe 10 which constitutes the composite toy structure of the present invention in the embodiment heretofor reduced to practice. Globe 10 comprises a plurality of surface features 12 which, as can be seen particularly in FIGS. 1 and 2, simulate the land mass shapes of the Earth's surface. There are also seen a plurality of seams 14, which as will be seen hereinafter in conjunction with FIGS. 3 through 8 comprise the edges of identifiable features of the toy components. In the embodiment shown herein, these components comprise an elephant 16, an eagle 18 and a whale 20. The exterior surface of globe 10, as seen in FIGS. 1 and 2, is made up of the exterior surfaces of these three individual component toy structures, the interior surfaces of such component toy structures being concealed within the globe 10, as will be seen hereinafter in more detail.

Figure 3:
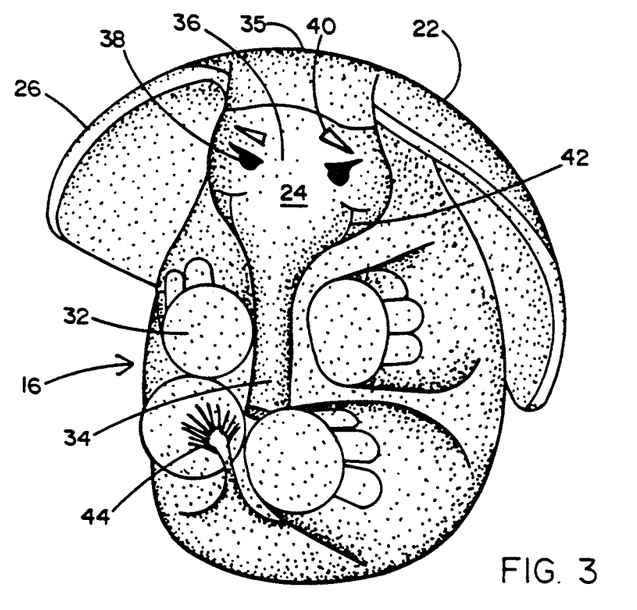
FIG. 3 is a plan view of one component toy member of the present invention, illustrating the interior surface thereof.
Figure 4:
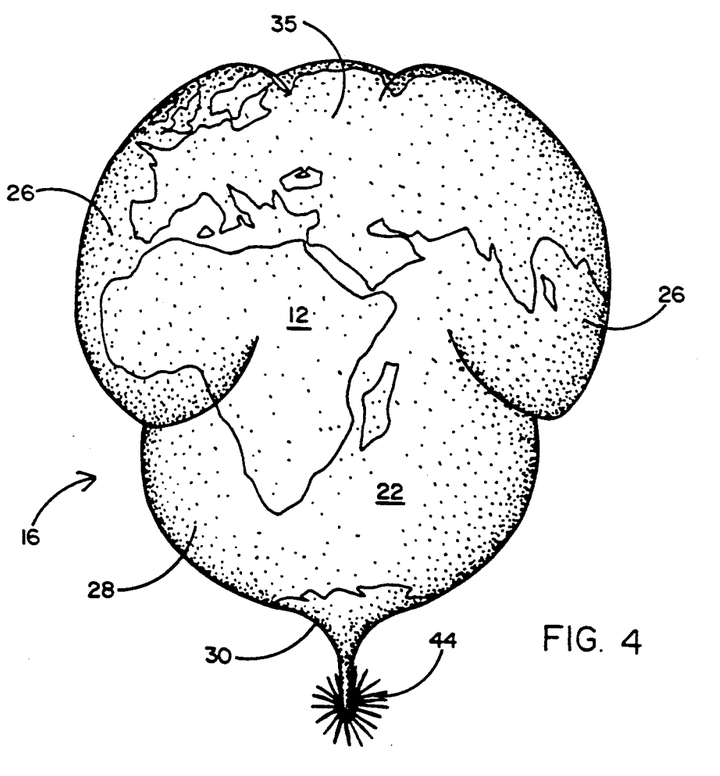
FIG. 4 is an exterior view of the component member of FIG. 3, showing the exterior surface thereof.

FIGS. 3 and 4 illustrate in more detail the shape and elements of the component toy comprising the elephant 16. As shown in FIGS. 3 and 4, the elephant 16 comprises an exterior surface 22 and an interior surface 24. Readily identifiable parts, which together simulate the appearance of an elephant, include ears 26, body 28, tail 30, legs 32, trunk 34, head 35, face 36, eyes 38, eyebrows 40, mouth 42 and a tail brush or end 44. There is of course, no intent to simulate the actual shape and appearance of an elephant in the embodiment shown herein, but instead to create an elephant appearance that is more cartoon-like in order to be able to achieve the surfaces and shapes desired for creating the composite structure of the globe 10 of FIGS. 1 and 2. Accordingly, the ears 26 are disproportionately large and have a generally rounded exterior surface, which as seen in FIG. 4, provide a significant portion of the resulting global surface after interconnection of the elephant 16 with the other component toys to be described hereinafter.

Figure 5:
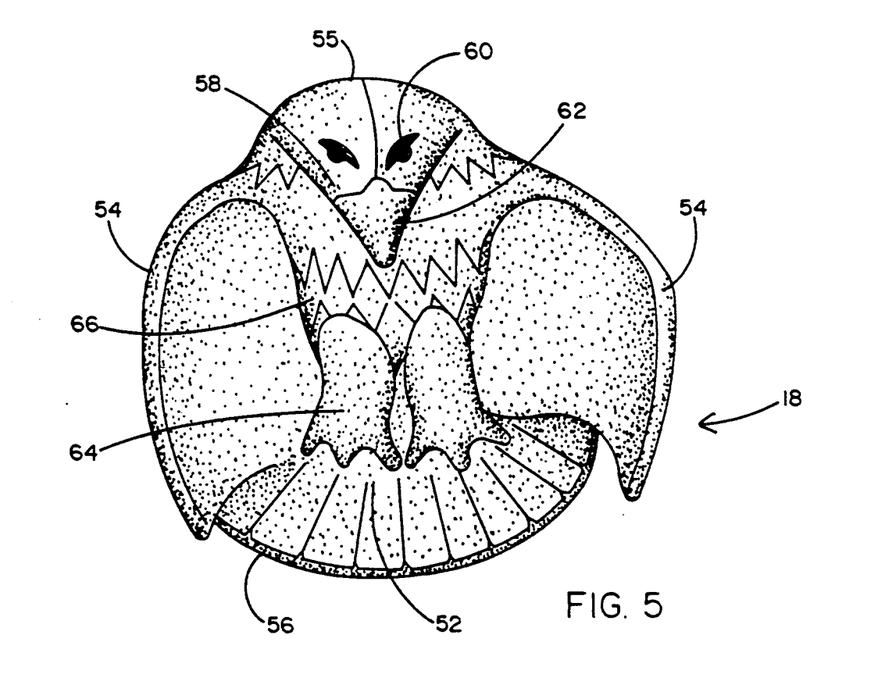
FIG. 5 is a plan view of the interior surface of still another component member of the present invention.
Figure 6:
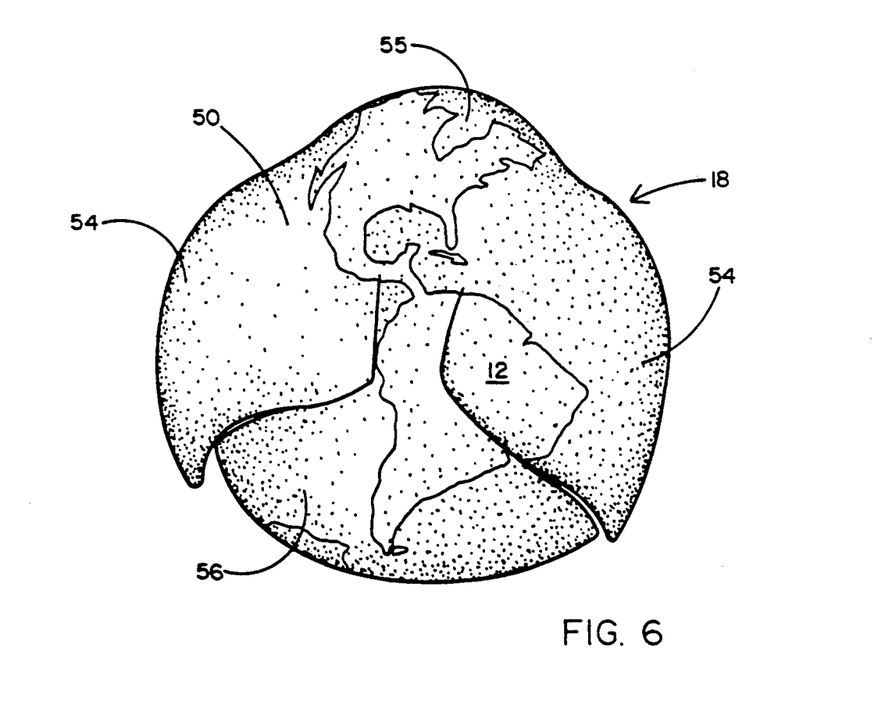
FIG. 6 is an exterior view of the component of the invention shown in FIG. 5.

A second component toy, namely eagle 18 of the embodiment of the present invention described herein, is shown in more detail in FIGS. 5 and 6. As seen therein, the eagle 18 comprises an exterior surface 50 and an interior surface 52. The individual identifiable features of the eagle 18 include wings 54, a head 55, tail feathers 56, a face 58, eyes 60, a beak 62, feet or claws 64 and a body 66. Here again, there is no intent to simulate the appearance of an actual eagle, but more to create a cartoon-like representation of an eagle with disproportionately sized wings and tail feathers to provide the exterior surfaces needed to fill in a significant portion of the global surface of the globe 10.

Figure 7:
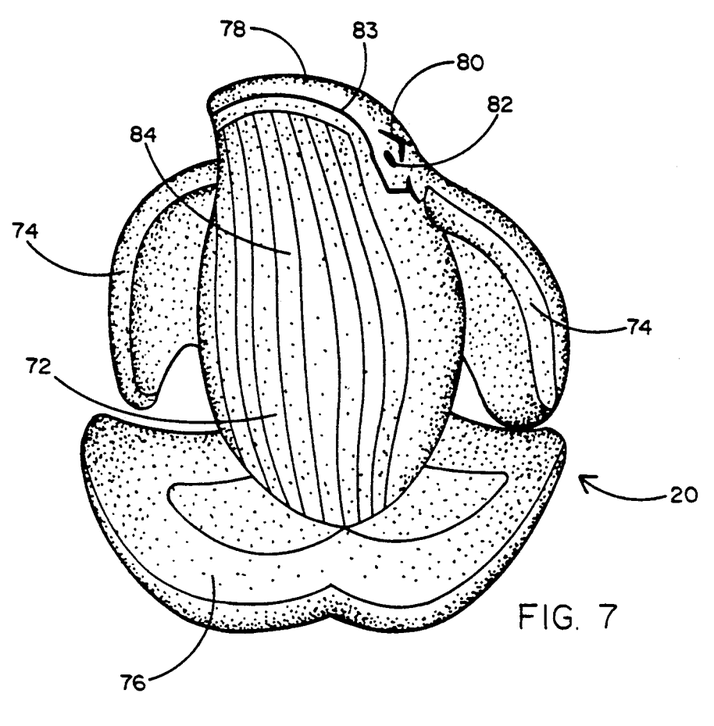
FIG. 7 is a plan view the interior surface of still another component member of the present invention.
Figure 8:
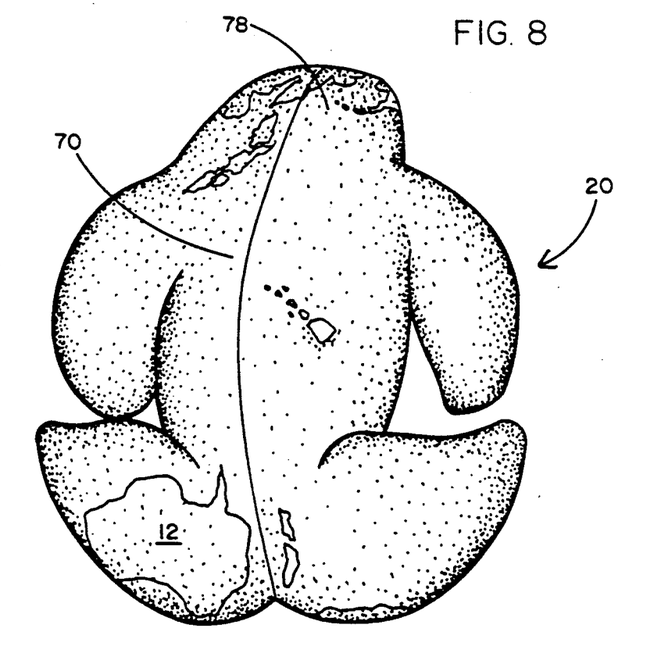
FIG. 8 is an exterior view of the component member of the invention shown in FIG. 7.
Figure 10:
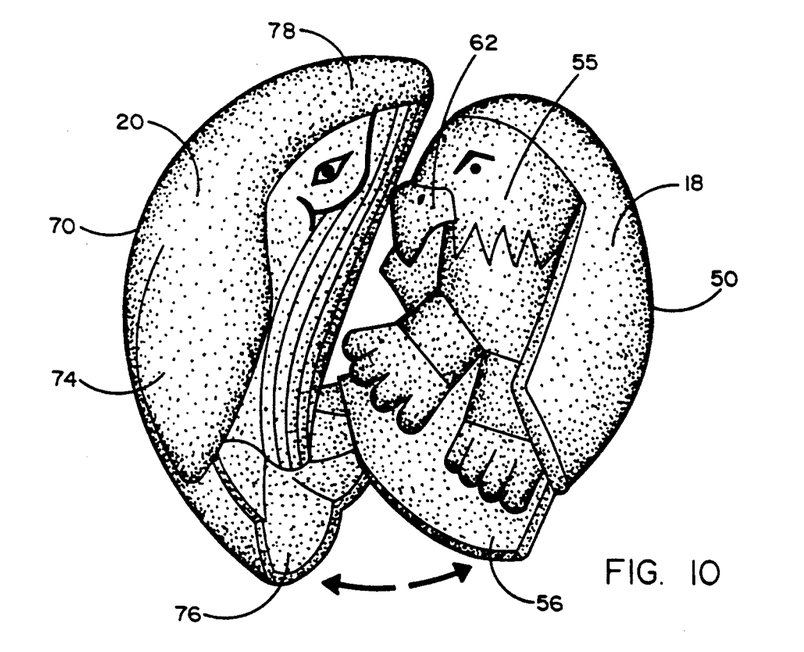
Figure 11:
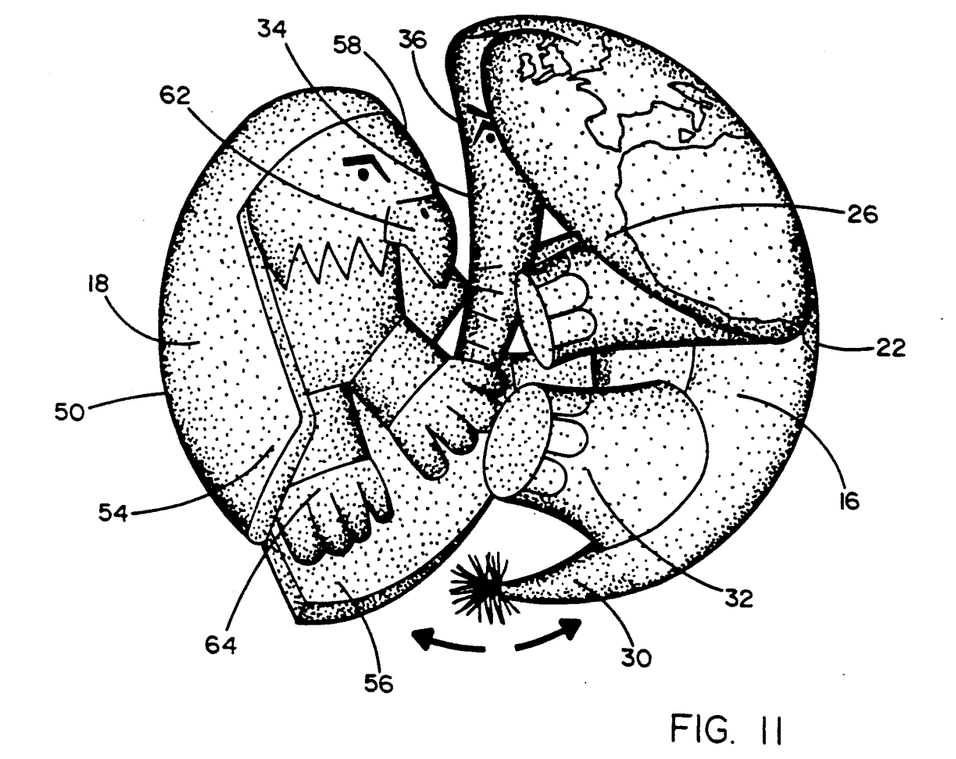

FIG. 7 and 8 illustrate the third component toy, namely the whale 20 of the present invention. As seen therein, whale 20 comprises an exterior surface 70 and an interior surface 72. Individually identifiable features of the whale 20 include flippers 74, tail fin 76, a head 78, eyebrows 80, eyes 82, mouth 83 and body 84. Once again, there is not intent to simulate the appearance of an actual whale, but instead the shape of whale 20 is more that of a cartoon-like character in which the flipper 74 and tail fin 76 are disproportionately large and shaped to provide a circular, external surface which includes a significant surface portion of the globe 10. It will be observed that each of the component toy structures, elephant 16, eagle 18 and whale 20, while having disproportionately sized body features, nevertheless is clearly identifiable as a toy elephant, eagle and whale, respectively, and is furthermore, an attractive stuffed toy with which children can readily be entertained. In addition to having exterior surfaces which are circular in shape and utilizing proportionately-sized body parts to provide the requisite portions of the globe 10 upon interconnection of the various component toy structures 16, 18 and 20, the other identifiable body parts provided in the interior surface portions of the respective component toys are arranged and shaped to be generally compatibly interconnected to permit the exterior surfaces to mate in a spherical configuration. This feature of the present invention is illustrated in FIGS. 9 through 11.

Figure 9:
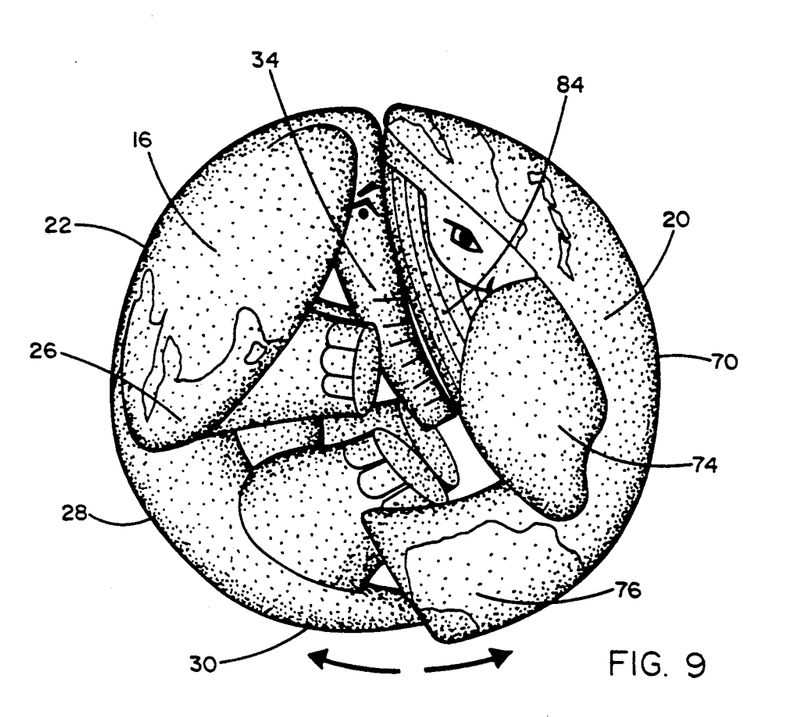
FIGS. 9, 10 and 11 illustrate respective use of the present invention during the assembly or disassembly thereof, illustrating the manner in which the individual components thereof may be interconnected to form the composite structure of the invention.

In FIG. 9, the elephant 16 and whale 20 are shown interconnected with the compatibility of surface shape between the trunk 34 of the elephant 16 and the body 84 of the whale 20 being demonstrated. Other such surface-compatability aspects of the component toys of the present invention are illustrated in FIGS. 10 and 11, wherein in FIG. 10, the eagle 18 and whale 20 are shown in the process of being interconnected and in FIG. 11, the elephant 16 and eagle 18 are shown undergoing the same process.

In the embodiment illustrate herein, each of the component toy structures is a stuffed toy. More specifically, it comprises an outer fabric skin, such as a felt-like fabric, which is sewn to enclose a flexible fabric filler, which may for example, be made of foam rubber or the like. The flexibility of such fabric and foam rubber materials render it relatively simple for the user to bend and shape the individual component toys, as required, to both interconnect them in a compatible manner to form a spherical surface and to merge their respective exterior surfaces in the proper relationship to form the globe 10. However, it will be understood that the individual component toys of the present invention need not be formed of fabric ad rubber-like materials, but could also be formed of other relatively flexible materials, such as certain plastics or other rubber-like components to facilitate easy manufacture and reduce cost. The same may be said of the means for fastening the respective component toys 16, 18 and 20 together to form the globe 10. The embodiment disclosed herein, which is presently the preferred embodiment of the invention, utilizes a plurality of Velcro strips. Velcro is a trademark of a well known fastening device which need not be described herein in any great detail. Suffice is to say that it comprises a plurality of loop-like elements on one strip and a plurality of loop interfacing elements on a mating strip, which when in contact with one another, tend to form an engaging relationship which can be used to hold objects to one another. In the present invention, such mating strips are provided along the edges of the respective component toys which are configured to interconnect with one another to form the globe 10. The particular configuration for interconnection used in the present invention is depicted in FIG. 12.

Figure 12:
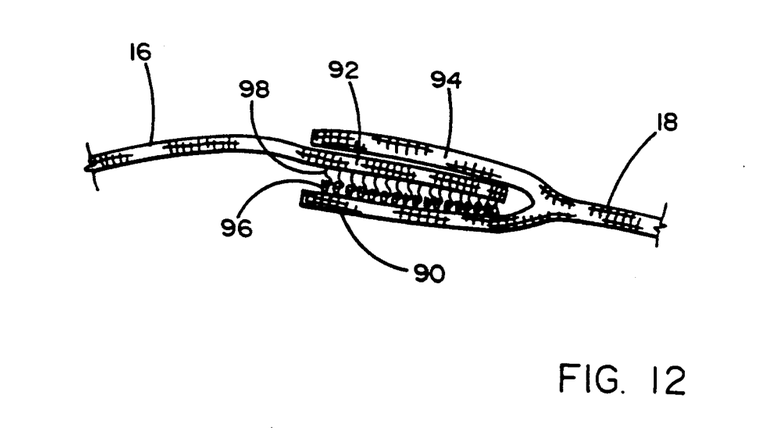
FIG. 12 is an enlarged side view of an exemplary fastening element of the present invention, illustrating the manner for interconnection of the components thereof, as well as for hiding the fastening means for forming a relatively uniform-looking composite structure.

As seen in FIG. 12, in the preferred embodiment of the invention shown herein, one of the interconnecting portions of a component toy, such as a perimeter flap 90 of the eagle 18 for example, is provided with one of the Velcro mating surfaces and another perimeter flap 92, of the elephant 16 for example, is provided with the oppositely gendered Velcro fastening strip. These fastening strips 96 and 98 are aligned to facilitate interconnection therebetween when the opposing flap members 90 and 92 are correctly positioned for interconnection, whereby a relatively low pressure force may be applied through both fastening members to effect the loop interconnecting engagement between the respective fastening Velcro strips 96 and 98. In the invention herein disclosed, there is furthermore an additional overlying flap 94, such as seen in FIG. 12, which is designed to reduce the likelihood of either fastening element of the Velcro strips being externally visible when the globe 10 of FIGS. 1 and 2 is fully formed. Accordingly, one would only see the seams 14 shown in FIGS. 1 and 2 externally of the globe 10 when it is fully configured by interconnection of component toys 16, 18 and 20. However, since the coloration of the land masses and water masses of the exterior surface of globe 10 may be made uniform, as well as bright and contrasting in coloration, the seams 14 can be significantly unobservable and certainly not a significant detraction from the geographical accuracy and general attractiveness of the globe 10 in its fully-formed configuration.

It will now be understood that what has been disclosed herein, comprises a composite toy having a plurality of interfitting toy components. The composite toy and the toy components, each has the shape of a separately identifiable structure, the exterior surfaces of the toy components forming the exterior surface of the composite toy when they are interconnected in a selected relationship. In the embodiment shown herein, the composite toy consists of a globe depicting the Earth's surface, including its land and water masses. The component toys comprise three stuffed animals comprising an elephant, an eagle and a whale. Fastening means are provided to permit interconnection of the toy components in a stable fashion, while minimizing any detrimental impact on the appearance of the complete toy structure. In the embodiment illustrated herein, the fastening devices consist of Velcro strips attached to the edges of the toy components which are adapted to interface with one another when an elephant, eagle and whale are interconnected to form the globe. Other fastening means may also be used as a substitution therefore, such as snap-type fastening elements or button-type fastening elements. Each of the component toys, which in the embodiment shown herein, comprise a stuffed animal, is formed of a fabric exterior such as a felt-like material which is stuffed with a fabric or rubber-like material in the interior thereof for forming the desired animal-simulated shape. Other materials may be readily used such as plastic like materials or other rubber-like materials which permit a degree of flexibility and shaping by the user to form the desired exterior surface relationship for interconnection and formation of the composite toy globe structure. Unlike known prior art, both the composite toy and the individual toy components of the present invention are readily and separately identifiable as toy objects. Furthermore, the composite toy is made entirely of the toy components and does not require the use of any non-toy component structures to facilitate its formation. The composite toy does not exist separately from the toy components and requires the interconnection of the toy components for its existence.

Those having skill in the art to which the present invention pertains, will now as a result of the applicant's teaching herein, perceive various modifications and additions which may be made to the invention. By way of example, other toy shapes, including composite toy shapes and individual component toy shapes may be utilized in carrying out the concepts disclosed herein. Furthermore, other fastening means may be used to interconnect the individual toy component structures to form the composite toy structure. Furthermore, other materials may be used, as noted herein above, to form the individual toy components and thus the resulting toy composite structure upon interconnection thereof. Accordingly, it will be understood that all such modifications and additions which may be made to the invention, are deemed to be within the scope thereof, which is to be limited only by the claims appended hereto and their equivalents.

I claim:

1. A flexible three-dimensional composite toy having predetermined cooperating indicia formed on an external surface thereof, comprising:
    (a) at least a first identifiable flexible three-dimensionally configured simulated stuffed toy figure having a first external surface with first indicia further defining said first external surface, said first flexible three-dimensionally configured simulated toy figure having a first inner surface defining simulated animal features;
    (b) at least a second identifiable three-dimensionally configured simulated stuffed toy figure having a second external surface with second indicia further defining said second external surface, said second identifiable three-dimensionally configured simulated toy figure having a second inner surface defining simulated animal features of a second animal; and,
    (c) releasable securement means for releasably securing said first and second identifiable three-dimensionally configured simulated toy figure inner surfaces each to the other to form said composite, flexible three-dimensional composite toy having a substantially continuous surface with cooperating indicia.

2. The composite toy recited in claim 1 wherein each said toy component simulates an animated creature.

3. The composite toy recited in claim 1 wherein said structure of said interconnected toy components is a geometric figure.

4. The composite toy recited in claim 3 wherein said geometric figure further comprises indicia of a globe on its exterior surface.

5. The composite toy recited in claim 1 wherein said toy components are different species of animals and said shape of said composite toy is spherical.

6. The composite toy recited in claim 5 wherein said spherical shape comprises land and ocean mass indicia to simulate the Earth's surface.

7. The composite toy recited in claim 5 wherein said species of animals comprise at least one land creature.

8. The composite toy recited in claim 5 wherein said species of animals comprise at least one water creature.

9. The composite toy recited in claim 5 wherein said species of animals comprise at least one flying creature.

10. The composite toy recited in claim 5 wherein said species of animals comprise at least one flying creature, a land creature and a water creature.

11. The composite toy recited in claim 10 wherein said flying creature is an eagle, said land creature is an elephant and said water creature is a whale.

12. The composite toy recited in claim 1 wherein each said toy component comprises fastening means for interconnection to at least one other such toy component.

13. The composite toy recited in claim 12 wherein each said toy component comprises means for covering the fastening means.

14. The composite toy recited in claim 12 wherein said fastening means comprises Velcro.

15. The composite toy recited in claim 1 wherein each said toy component is made of a fabric material.

16. A globe comprising:
    (a) at least a first identifiable flexible three-dimensionally configured simulated stuffed toy figure having a first external surface with first indicia further defining said first external surface, said first flexible three-dimensionally configured simulated toy figure having a first inner surface defining simulated animal features;
    (b) at least a second identifiable three-dimensionally configured simulated stuffed toy figure having a second external surface with second indicia further defining said second external surface, said second identifiable three-dimensionally configured simulated toy figure having a second inner surface defining simulated animal features of a second animal; and, (c) releasable securement means for releasably securing said first and second identifiable three-dimensionally configured simulated toy figure inner surfaces each to the other to form said globe having indicia which form a map on the surface of said globe when said identifiable three-dimensionally configured simulated stuffed toy figures are interconnected.

17. The globe recited in claim 16 wherein each said stuffed toy figure comprises an independently usable toy structure.

18. The globe recited in claim 17 wherein each such toy structure is an animal simulation.

19. The globe recited in claim 18 wherein at least one such toy structure is a land animal, at least one such toy structure is an water animal and at least on such toy structure is a flying animal.

20. The globe recited in claim 19 wherein said land animal is an elephant, said water animal is a whale and said flying animal is an eagle.

* * * * *